March 19, 1957 W. L. KNOWLES 2,785,717
MACHINE FOR MAKING CORRUGATED WOOD
Filed Nov. 10, 1953 4 Sheets-Sheet 1
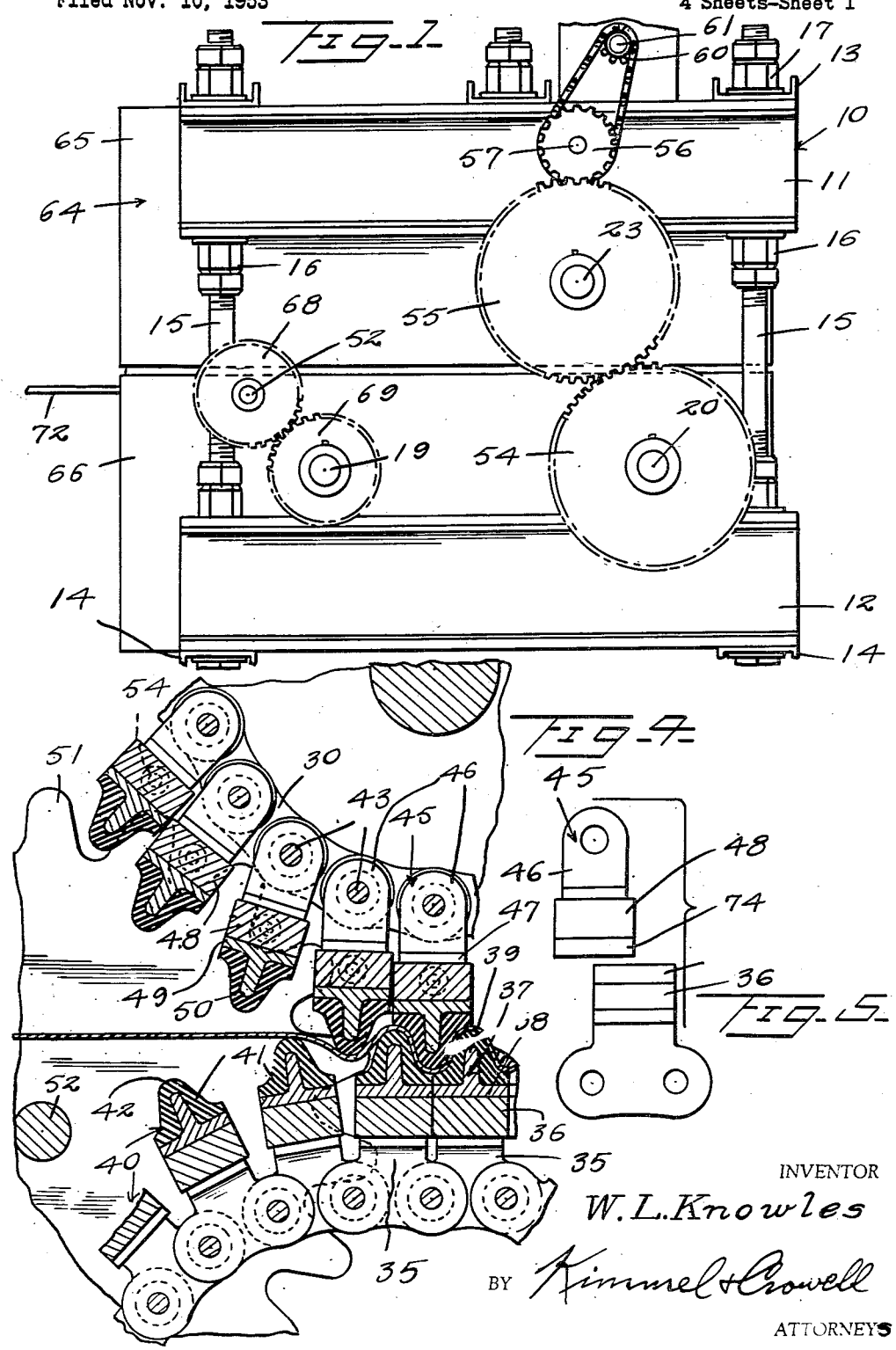
INVENTOR
W. L. Knowles
BY Kimmel & Crowell
ATTORNEYS March 19, 1957 W. L. KNOWLES 2,785,717
MACHINE FOR MAKING CORRUGATED WOOD
Filed Nov. 10, 1953 4 Sheets-Sheet 2

INVENTOR
W. L. Knowles
BY Kummel & Crowell
ATTORNEYS

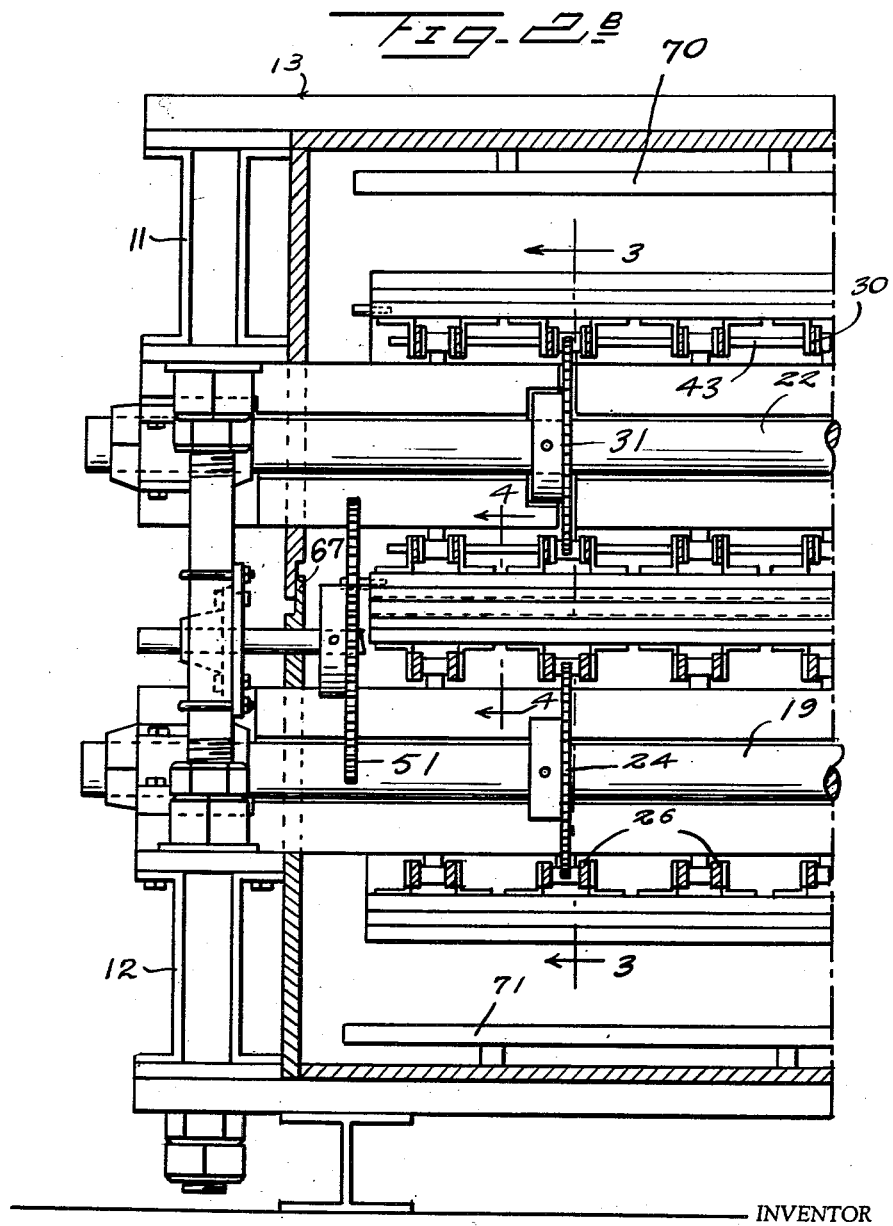

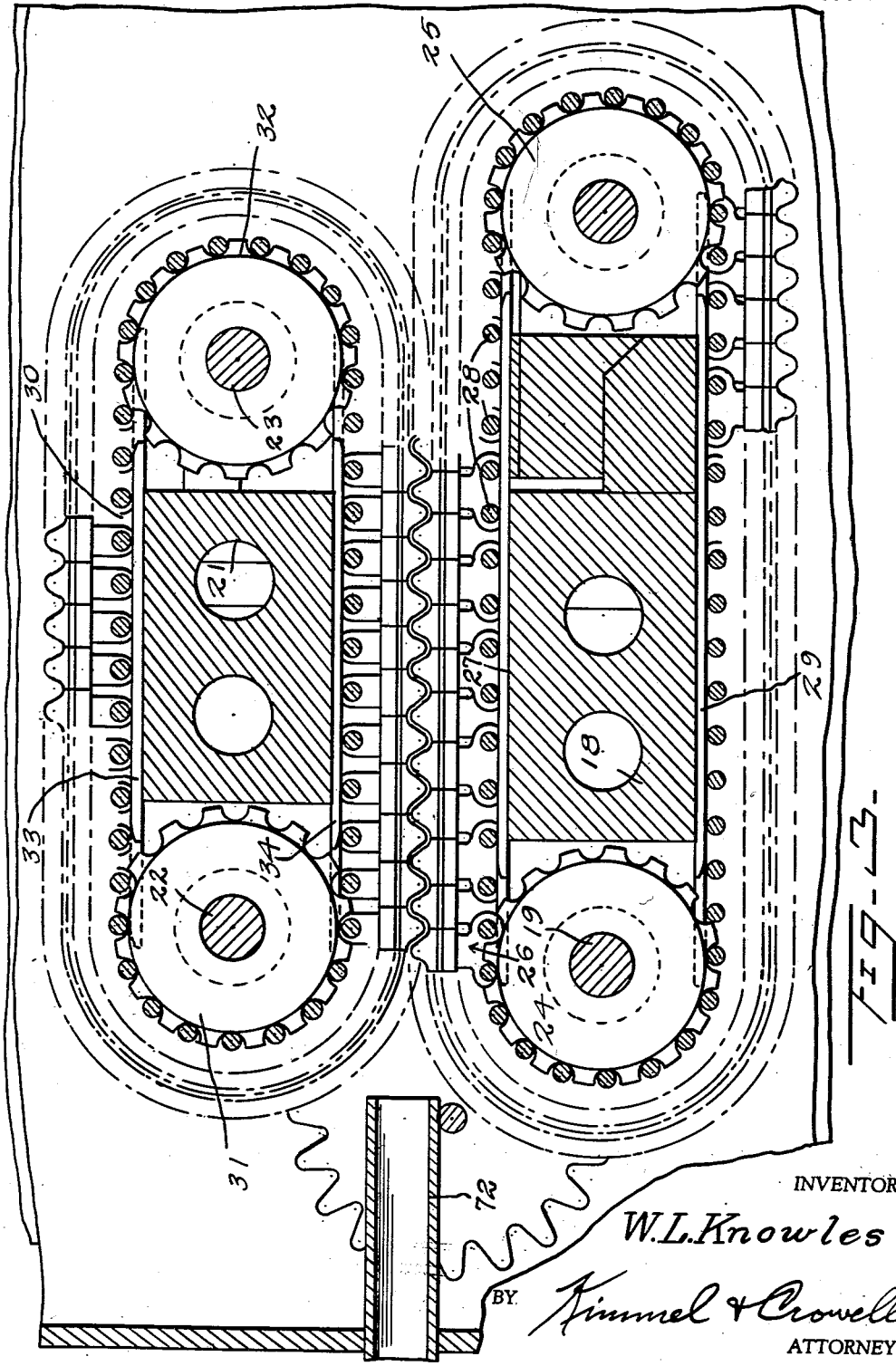

United States Patent Office 2,785,717
Patented Mar. 19, 1957

2,785,717

MACHINE FOR MAKING CORRUGATED WOOD

William Lee Knowles, Augusta, Ga., assignor to Coru-Ply Corporation, Murfreesboro, N. C., a corporation of North Carolina Application November 10, 1953, Serial No. 391,258

5 Claims. (Cl. 144—254)

This invention relates to a reverse curve forming and laminating machine.

An object of this invention is to provide a machine for making a laminated reverse curve in the form of a corrugated lamination with outer plies of paper or other fibrous material.

Another object of this invention is to provide a corrugating machine for making a lamination in a continuous process, the machine embodying interengaging corrugating elements which are movably mounted in the machine. The machine includes a heated cabinet encasing the corrugating elements so that the adhesive which is applied to the plies will be thoroughly cured.

Another object of this invention is to provide a corrugating machine which can be adjusted for making laminations of varying thicknesses and depths.

A further object of this invention is to provide in a corrugating machine, elongated corrugating bars which are formed of a rigid T-shaped bar and a rubber covering about the stem portion of the bar.

In a modification of this invention the corrugating elements are removed and flat bars substituted therefor so that the machine will produce a flat laminated panel.

With the above and other objects in view, my invention consists in the arrangement, combination and details of construction disclosed in the drawings and specification and then more particularly pointed out in the appended claims.

In the drawings:

Figure 1 is a detail side elevation of a hollow core making machine constructed according to an embodiment of this invention.

Figures 2A and 2B are vertical sections taken transversely through the machine.

Figure 3 is a fragmentary sectional view taken on the line 3—3 of Figure 2B.

Figure 4 is a fragmentary sectional view on an enlarged scale taken on the line 4—4 of Figure 2B.

Figure 5 is a fragmentary end elevation of a modified form of laminating bars.

Figure 2A:
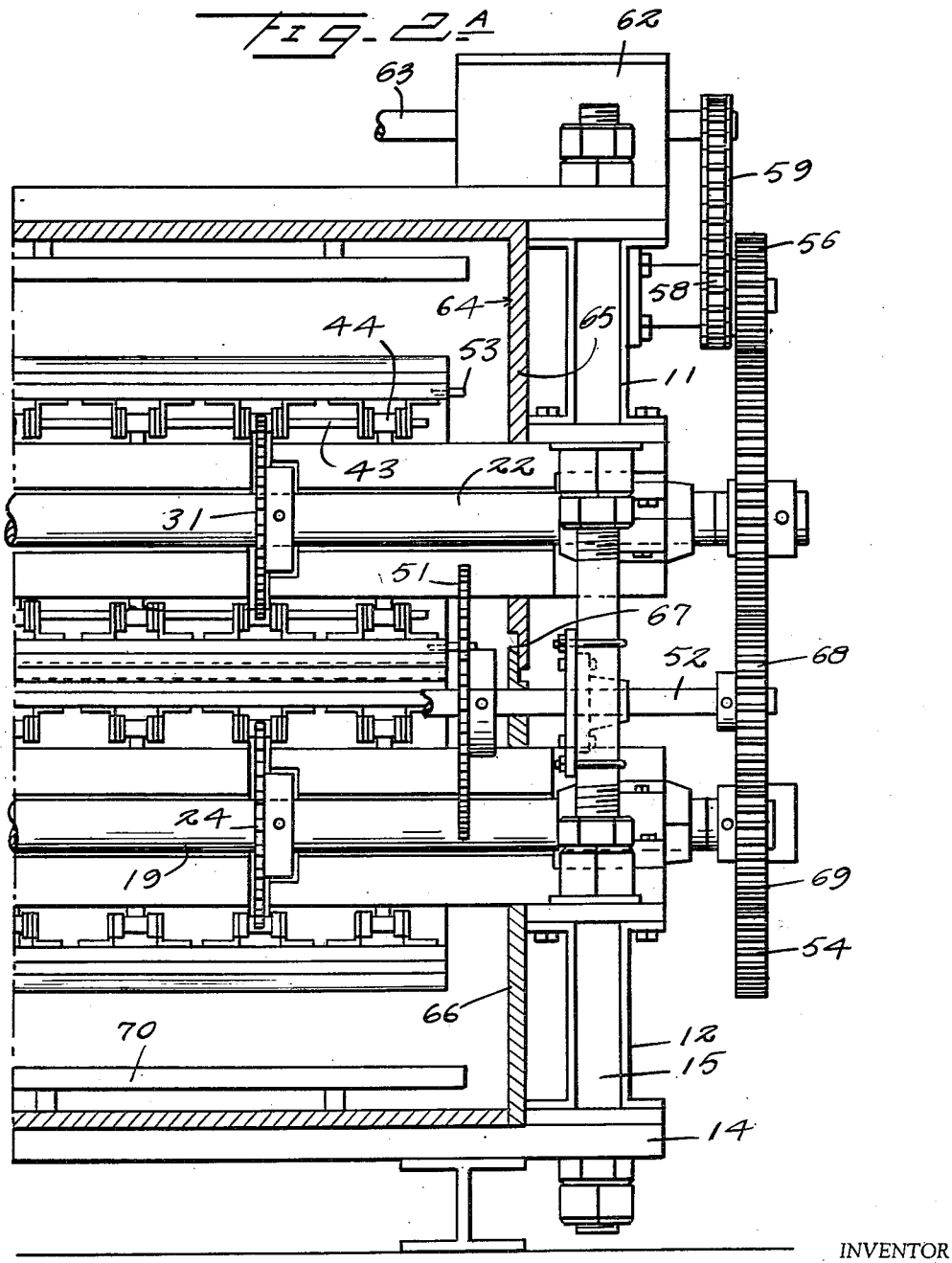

Referring to the drawings, the numeral 10 designates generally a frame structure which is formed of upper and lower longitudinally disposed bars 11 and 12 respectively. The frame 10 is also formed of transversely disposed upper and lower channel bars 13 and 14 respectively. The frame bars 11 and 12 are held in spaced relation by means of threaded bars 15 which adjustably support bars 11 with respect to bars 12. The bars 15 have threaded nuts 16 engaging the lower sides of bars 11 and tightening nuts 17 are secured to the upper portions of the bars or rods 15. A lower plate 18 is fixed in the frame 10 between the lower bars 12 and a pair of shafts 19 and 20 are rotatedly carried by the forward and rear ends respectively of the plate 18. An upper plate 21 is secured between upper frame bars 11, and an upper pair of shafts 22 and 23 are journalled at the forward and rear ends of the upper plate 21.

A forward pair of sprockets 24 are fixed to shaft 19 and a rear pair of sprockets 25 are fixed to the rear shaft 21. A plurality of endless chains 26 are trained about sprockets 24 and 25. The upper and lower runs of the chains 26 engage over the upper and lower sides of the plate 18. Plate 18 has secured to the upper side thereof a plurality of rails 27 which are engaged by the rollers 28 of chains 26, and the lower side of plate 18 has secured thereto a plurality of lower rails 29 which are engaged by the rollers on the lower runs of the chains 26. A plurality of chains 30 are trained about the upper sprockets 31 and 32 which are mounted on the shafts 22 and 23 respectively, and the upper runs of the chains 30 engage a plurality of upper rails 33 carried by the upper side of plate 21.

A plurality of lower rails 34 are carried by the lower side of plate 21 and are engaged by the lower runs of chains 30. The lower runs of chains 30 confront the upper runs of chains 26. The links of the lower chains 26 are formed with right angle extensions 35 and elongated bars 36 are fixed to the link extensions 35. Each bar 36 has fixed to the outer side thereof a T-shaped corrugating bar 37 which has the head 38 thereof fixed by welding, or other suitable fastening means to the outer side of bar 36. The stem portion 39 of each T-shaped bar 37 has mounted thereon a rubber covering 40 which encompasses the stem 39 and covers the lower side of the head 38. The rubber covering 40 is formed with outwardly converging opposite faces 41 which merge together in a rounded rib 42.

The upper chains 30 have the links thereof connected together by means of a pivot rod or shaft 43, and a roller 44 engages about the rod 43 between the pairs of links of each chain 30. The right angular bracket 45 has one side 46 thereof pivotally mounted on the shaft 43, and the other or outer side 47 of angle 45 is secured to an elongated bar 48. The bar 48 is of a length equal to bar 36 and extends transversely with respect to the frame 10. A T-shaped bar 49 forming a corrugating bar is fixed in any suitable manner to the outer side of each bar 48, and bar 49 which is similar to bar 47 is covered by means of a rubber covering 50 similar to covering 40.

The corrugating bars, including bars 37 with covering 40 and bars 49 with covering 50, interengage each other on the confronting runs as shown in Figure 3. The spacing between the interengaging bars of the upper and lower corrugating units is adjusted by adjusting the nuts 16 and 17 and the upper frame bars 11. At the leading or intake end of the machine, which is the left end shown in Figure 3, the pivotally carried upper corrugating bars are controlled and guided as to their pivotal movement at the time the upper corrugating bars enter the intake zone, that is, the space lying between the converging upper and lower bars, by means of a toothed wheel or sprocket 51 which is mounted on the shaft 52. Each bar 48 has projected from the opposite ends thereof a roller 53 which is engaged between the teeth of sprocket 51 so that the upper corrugating bars will be properly guided into the initial pressure applying zone in substantially parallel relation to the bars in the final pressure applying zone as the upper corrugating bars pass about the forward sprocket wheels 31 and move along the lower run of the chains 30.

The rear shafts 20 and 23 are operatively connected together by means of gears 54 and 55 respectively, and the driving gear 56 mounted on an upper shaft 57 also has fixed thereto a sprocket 58. A chain 59 is trained about sprocket 58 and also about a sprocket 60 secured to a shaft 61 extending from a speed reducing unit 62 of conventional construction. The speed reducing unit 62 has extending therefrom a shaft 63 adapted to be connected to a power member (not shown). The upper and lower corrugating members hereinbefore described are enclosed in a heat insulated housing 64 which is formed of an upper housing member 65 and a lower housing member 66. The housing members 65 and 66 are adjustably or slidingly coupled together by means of an overlapping joint 67, as shown in Figures 2A and 2B. The control sprocket 51 is rotated by means of a gear 68 mounted on shaft 52 and meshing with a forward gear 69 which is mounted on shaft 19. The interior of the housing 64 is heated by means of upper and lower heating elements 70 and 71 respectively which are fixed in the housing 64 above and below the upper and lower endless corrugating units.

A guide or table 72 projects forwardly from the leading end of the corrugating units and a laminated member formed of one or more plies of veneer is adapted to be moved over the guide or table 72 into the leading end of the device for engagement between the interengaging bars. As an example, the material which is formed by the corrugating machine hereinbefore described may be formed by an inner sheet of wood and outer sheets of paper which are adhesively secured to the opposite faces of the wood veneer. At the time the material is fed into the machine the adhesive which will secure the sheets together is uncured and the heat applied thereto by the heating elements 70 and 71 will cure the adhesive so that the adhesive will be firm by the time the laminated member passes from between the confronting runs of the endless corrugating members.

Referring now to Figure 5 if it is desired to form the lamination in a flat panel, flat bars 73 are secured to the upper bars 48 and flat bars 74 are secured to the lower bars 36. As shown in Figure 5, the upper bars 48 are staggered with respect to the lower bars 36 so that when flat pressure applying bars, such as 73 and 74 are secured to the bars 48 and 36 respectively, the lamination will be formed into a flat panel.

Figure 6:
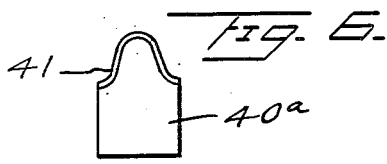
Figure 6 is an end elevation of another modified form of die bar.

Referring now to Figure 6, there is disclosed another form of corrugating bar 40a which is formed as a solid unit which may be extruded or cast, and bar 40a may have a rubber covering 41a.

In the use and operation of this machine the lamination, which in the present instance is formed of an inner wood ply and a pair of outer paper plies, is fed into the leading end of the machine over the table or guide 72. The grain of the wood lamination runs lengthwise of the corrugating bars so that the wood lamination can be readily bent without splitting thereof. As the initially unsecured sheets enter the leading end of the machine, they engage between the interengaging upper and lower corrugating bars, as shown more clearly in Figure 4, and will be bent into a corrugated shape which will retain its corrugated configuration after laminated material passes through the machine. This corrugated sheet may be used in various applications, and as one example, may be used between a pair of laminated panels to form a door, a table top or other relatively thick panels which will be exceedingly light in weight and strong enough to withstand any stresses to which it may be put.

The heat which is used in this machine is of such a degree or temperature that the heat will set the wood by fusing the lignin or moisture in the cells. The temperature will vary within a range of a minimum of 260° F. and a maximum of approximately 325° F. There are a number of factors which govern the degree of heat and the time of application of heat and pressure. These factors are the thickness, character and moisture content of the paper, the thickness, viscosity and character of the adhesive, the density of the wood fibers, and the moisture content of the wood. The time of application of the pressure and heat is between ten and twenty seconds, but with certain types of adhesives the time may be very materially reduced.

What is claimed is:

1. A reverse curve forming and laminating machine comprising a frame, a pair of upper shafts journalled in said frame, a pair of lower shafts journalled in said frame, a pair of sprockets on each of said shafts, an upper pair of chains trained about the sprockets on said upper pair of shafts, a lower pair of chains trained about the sprockets on said lower pair of shafts, operating means for said shafts, upper elongated corrugating bars pivotally carried by said upper pair of chains, lower elongated corrugating bars carried by said lower pair of chains, means adjusting said upper shafts relative to said lower shafts, and rotary means in the intake zone of said machine for engaging said upper corrugating bars and successively pivoting each of said corrugating bars into a substantially parallel relation to the preceding adjacent bar prior to the meshing of said upper and lower bars.

2. A reverse curve forming and laminating machine comprising a frame, a lower plate carried by said frame, a pair of lower shafts disposed one at each end of said lower plate, a pair of sprockets fixed to each lower shaft, a pair of lower chains trained about said sprockets, the upper and lower runs of said chains engaging about the upper and lower faces of said lower plate, upper and lower guide rails for said chains carried by said lower plate, a plurality of elongated bars fixed between said pairs of chains, an upper plate, means adjustably supporting said upper plate in confronting position to said lower plate, an upper pair of shafts disposed one at each end of said upper plate, a pair of upper sprockets fixed to each of said upper shafts, an upper pair of shafts engaging about said upper sprockets and about the upper and lower faces of said upper plate, upper and lower chain guide rails carried by said plate, a plurality of elongated bars pivotally secured to said upper pair of chains, operating means for said shafts, and sprocket means in the intake zone of said machine for engaging said upper corrugating bars and successively pivoting each of said corrugating bars into a substantially parallel relation to the preceding adjacent bar prior to the meshing of said upper and lower bars.

3. A reverse curve forming and laminating machine comprising a frame, a lower plate carried by said frame, a pair of lower shafts disposed one at each end of said lower plate, a pair of sprockets fixed to each lower shaft, a pair of lower chains trained about said sprockets, the upper and lower runs of said chains engaging about the upper and lower faces of said lower plate, upper and lower guide rails for said chains carried by said lower plate, a plurality of elongated bars fixed between said pairs of chains, an upper plate, means adjustably supporting said upper plate in confronting position of said lower plate, an upper pair of shafts disposed one at each end of said upper plate, a pair of upper sprockets fixed to each of said upper shafts, an upper pair of shafts engaging about said upper sprockets and about the upper and lower faces of said upper plate, upper and lower chain guide rails carried by said plate, a plurality of elongated upper bars, means pivotally securing said upper bars to said upper pair of chains, operating means for said shafts, and movable means in the intake zone of said machine for engaging said upper corrugating bars and successively pivoting each of said corrugating bars into a substantially parallel relation to the preceding adjacent bar prior to the meshing of said upper and lower bars.

4. A reverse curve forming and laminating machine comprising a frame, a lower plate carried by said frame, a pair of lower shafts disposed one at each end of said lower plate, a pair of sprockets fixed to each lower shaft, a pair of lower chains trained about said sprockets, the upper and lower runs of said chains engaging about the upper and lower faces of said lower plate, upper and lower guide rails for said chains carried by said lower plate, a plurality of elongated bars fixed between said pairs of chains, an upper plate, means adjustably supporting said upper plate in confronting position to said lower plate, an upper pair of shafts disposed one at each end of said upper plate, a pair of upper sprockets fixed to each of said upper shafts, an upper pair of shafts engaging about said upper sprockets and about the upper and lower faces of said upper plate, upper and lower chain guide rails carried by said plate, a plurality of elongated upper bars, means pivotally securing said upper bars to said upper pairs of chains, a control shaft at the forward end of said frame, a pair of control sprockets carried by said control shaft, rollers carried by the opposite ends of said upper bars engageable with said control sprockets, said control sprockets guiding said upper bars relative to said lower bars, an operative connection between said control shaft and one of said first named shafts, and operating means for said first-named shafts.

5. A reverse curve forming and laminating machine comprising a frame, a lower plate carried by said frame, a pair of lower shafts disposed one at each end of said lower plate, a pair of sprockets fixed to each lower shaft, a pair of lower chains trained about said sprockets, the upper and lower runs of said chains engaging about the upper and lower faces of said lower plate, upper and lower guide rails for said chains carried by said lower plate, a plurality of elongated bars fixed between said pairs of chains, an upper plate, means adjustably supporting said upper plate in confronting position to said lower plate, an upper pair of shafts disposed one at each end of said upper plate, a pair of upper sprockets fixed to each of said upper shafts, an upper pair of shafts engaging about said upper sprockets and about the upper and lower faces of said upper plate, upper and lower chain guide rails carried by said plate, a plurality of elongated upper bars, means pivotally securing said upper bars to said upper pairs of chains, a control shaft at the forward end of said frame, a pair of control sprockets carried by said control shaft, rollers carried by the opposite ends of said upper bars engageable with said control sprockets, said control sprockets guiding said upper bars relative to said lower bars, an operative connection between said control shaft and one of said first-named shafts, operating means for said first-named shafts, a housing enclosing said bars and chains, and heating means in said housing.

References Cited in the file of this patent

UNITED STATES PATENTS

| | | |
|---|---|---|
| 990,080 | Thiebaut | Apr. 18, 1911 |
| 1,284,771 | Quinn | Nov. 12, 1918 |
| 1,361,970 | Dickey | Dec. 14, 1920 |
| 1,706,675 | Osgood | Mar. 26, 1929 |
| 2,071,999 | Dike | Feb. 23, 1937 |
| 2,350,996 | Atkinson | June 13, 1944 |
| 2,447,784 | Wood | Aug. 24, 1948 |
| 2,640,517 | Mello | June 2, 1953 |
| 2,675,053 | Clemens | Apr. 13, 1954 |